(12) United States Patent
Danley et al.

(10) Patent No.: US 8,340,485 B2
(45) Date of Patent: Dec. 25, 2012

(54) LASER-SHAPED OPTICAL FIBERS ALONG WITH OPTICAL ASSEMBLIES AND METHODS THEREFOR

(75) Inventors: Jeffrey D. Danley, Hickory, NC (US); Joel C. Rosson, Hickory, NC (US)

(73) Assignee: Corning Cable Systems LLC, Hickory, NC (US)

(*) Notice: Subject to any disclaimer, the term of this patent is extended or adjusted under 35 U.S.C. 154(b) by 574 days.

(21) Appl. No.: 12/474,923

(22) Filed: May 29, 2009

(65) Prior Publication Data

US 2010/0303416 A1 Dec. 2, 2010

(51) Int. Cl.
*G02B 6/26* (2006.01)
(52) U.S. Cl. ............... 385/43; 385/39; 385/76; 385/77; 385/78; 385/81
(58) Field of Classification Search ............ 385/15, 385/39, 43, 76, 77, 78, 81
See application file for complete search history.

(56) References Cited

U.S. PATENT DOCUMENTS

| 7,216,512 | B2 * | 5/2007 | Danley et al. ............ 65/392 |
| 2004/0047587 | A1 | 3/2004 | Osborne ............ 385/147 |
| 2006/0147157 | A1 | 7/2006 | Manning et al. ............ 385/78 |
| 2007/0172191 | A1 * | 7/2007 | Song ............ 385/134 |
| 2007/0286554 | A1 | 12/2007 | Kuffel et al. ............ 385/60 |
| 2010/0129031 | A1 * | 5/2010 | Danley et al. ............ 385/59 |

* cited by examiner

*Primary Examiner* — Jennifer Doan

(57) ABSTRACT

Disclosed are optical assemblies such as field-installable connectors having a laser-shaped optical fiber along with methods for laser-shaping the optical fiber. The field-installable connector includes a ferrule having front and rear opposed faces and at least one fiber bore defined longitudinally therethrough, a stub optical fiber having a distal end with a laser-shaped end face is disposed within the at least one fiber bore of the ferrule and extends a predetermined distance beyond the rear face of the ferrule, and an alignment feature operable for aligning the stub optical fiber with the field optical fiber. One method of laser-shaping the optical fiber includes rotating the optical fiber and sweeping a beam of a laser across the optical fiber and then essentially stopping the rotation of the optical fiber and sweeping the beam through the optical fiber to cut the same with a tapered and angled end face. Other methods may include shifting the laser relative to the optical fiber to create a "pencil-tip" end on the optical fiber.

15 Claims, 9 Drawing Sheets

LASER-SHAPED OPTICAL FIBERS ALONG WITH OPTICAL ASSEMBLIES AND METHODS THEREFOR

FIELD

The present disclosure relates generally to laser-shaped optical fibers and optical assemblies such as field-installable connectors having a mechanical splice along with methods for laser-shaping optical fibers. In one embodiment, the disclosure is directed to a method for cutting and laser-shaping an optical fiber with a tapered and angled end face along with optical assemblies using the same.

TECHNICAL BACKGROUND

Optical fibers are used for a variety of applications including voice communication, data transmission and the like. With their ever increasing and varied use, it is apparent that efficient methods of splicing optical fibers are required. In order to efficiently couple the signals transmitted between respective optical fibers, the method of splicing the optical fibers must not significantly attenuate or alter the transmitted signals. Currently, there are two main methods for splicing optical fibers: fusion splicing and mechanical splicing. Mechanical splicing is a fiber optic mating system in which the ends of two optical fibers are brought into physical contact with each other and held in place by a mechanical force, such as a "cam" locking mechanism or a crimp. In other words, the optical fiber are aligned and butted together and then clamped in place to inhibit movement between the mechanical splice of the optical fibers.

Conventional mechanical splicing methods typically involve filling any gaps, hereinafter referred to as "core gaps", between the fiber end faces with an index matching gel. The gel acts as a medium that transfers light between a field fiber and an optical fiber stub. Even though mechanical splices generally provide acceptable signal transmission characteristics, a mechanical splice can reflect a portion of the transmitted signal so as to produce a corresponding return loss. The reflectance is due, at least in part, to differences between the respective indices of refraction of the field fiber and the optical fiber stub. The index matching gel helps to reduce the differences in the indices of refraction between the fiber cores and the core gap.

To create a conventional mechanical splice, the ends of two fibers are typically cleaved and inserted into a mechanical splice assembly having precision fiber alignment features, such as machined or etched grooves running longitudinally through the assembly. The number of grooves and their respective dimensions are of a size to permit the fibers to rest within them. Typically, the fibers are cleaved using a mechanical cleaver that produces a substantially flat fiber end face either perpendicular or at a predetermined angle relative to the longitudinal axis of the fiber. Mechanical cleaves/cleavers may suffer from several disadvantages. First, they have an inherent glass defect zone that is a result of the mechanical blade striking the glass fiber. Second, they have sharp edges between the cleave face and the fiber outer diameter. This sharp edge can skive the groove components of the mechanical splice assembly. Third, they have substantially flat fiber end faces with cleave angles that can be non-perpendicular to the fiber outer diameter. This angle may increase the fiber core gap when the fibers are butted in the mechanical splice assembly, which increases attenuation. In addition to these disadvantages, mechanical cleavers require periodic cleaver blade replacement and are not automation friendly devices due to long-term instability.

In order to reduce back reflection, especially in high-power applications, the optical fibers may be mechanically cleaved at a predetermined angle. For instance, mechanical splice can have two mating fibers with respective end faces that are cleaved at an angle such as 8 degrees to eliminate back reflection at any index of refraction transition. Ideally, the two angles of the fibers in the mechanical splice (i.e., the end face angles on mating fibers) are matched or aligned to reduce core gap and thus optical signal loss of the mechanical splice. In practice it is difficult task to perform an angled cleave in a repeatable and reproducible fashion.

Thus there is a need for forming angled cleaves in optical fibers that overcome the disadvantages mentioned above for optical assemblies such as for mechanical splice connectors, especially mechanical splice connectors that carry high-power optical signals. The method should repeatable, reliable, and produce a fiber end face that is substantially free of defects. It would also be desirable to produce a shaped fiber end face that minimizes the core gap in applications in which it is mated to a field prepared fiber with a mechanical angled cleave. Preferably, the processing method is automation friendly, stable, and has no consumables that wear and affect performance of the angled cleave with use.

SUMMARY

Disclosed are optical assemblies such as field-installable connectors having a laser-shaped optical fiber along with methods for making the same. The present disclosure describes various methods for using a laser to cut and shape an end face of an optical fiber in general, and an optical fiber stub of a field-installable connector. The fiber laser processing methods described below substantially reduce or eliminate a glass defect zone, produce an edge radius that aids fiber insertion into a mechanical splice assembly while minimizing skiving, and produce a generally convex or domed angled fiber end face that minimizes the core gap in a mechanical splice section. The laser-shaped optical fiber can be used in any suitable optical assembly such as a mechanical splice device like a field installable connector.

In one embodiment, a field-installable connector comprises a ferrule having a front face and a rear face and at least one fiber bore defined longitudinally therethrough, a stub optical fiber disposed within the at least one fiber bore of the ferrule having a distal end face extending a predetermined distance beyond the rear face of the ferrule, and an alignment feature for aligning the stub optical fiber and the field optical fiber. The distal end face of the stub optical fiber being laser-shaped to have a tapered and angled end face. During use, the stub optical fiber and a field optical fiber and brought into end-to-end physical contact and secured in place within the field-installable connector.

In other embodiments, the field-installable connector may further comprise a spring element operable for providing float to the ferrule within a connector housing and a ferrule holder defining a lead-in feature operable for guiding the field optical fiber into the alignment feature. The field-installed connector may be assembled in the field and mechanically spliced to a termination point of an optical fiber cable. The stub optical fiber is laser-shaped by first rotating the optical fiber and sweeping a laser beam across the rotating optical fiber, wherein the laser-shaping is achieved by impinging an amount of a predetermined laser intensity in the form of a Gaussian intensity distribution onto the stub optical fiber.

After the fiber has sufficiently "necked" down during the rotating motion of the optical fiber, the rotating motion is essentially stopped and the fiber is cut through or severed at a predetermined angle such as eight degrees or the like by the sweeping laser beam through the optical fiber.

The disclosure is also directed to a method of fabricating a field-installable connector used in a mechanical splicing application. The method comprises rotating a stub optical fiber secured within a ferrule of the field-installable connector and cutting and shaping an end of the stub optical fiber by first sweeping a beam of a laser, directed at a predetermined angle from perpendicular to a longitudinal axis of the stub optical fiber, back and forth across the rotating fiber. After the fiber has "necked" down sufficiently during the rotating motion of the optical fiber, the rotating motion is essentially stopped and the fiber is cut through or severed at a predetermined angle by the sweeping laser beam through the optical fiber. In one example, the laser is operated in a continuous mode, but other modes are possible. An oscillating motion of the laser may be driven by an intermitting sinusoidal signal resulting in two deposits of energy into the optical fiber followed by a cooling period before the next deposits of energy occur. A pulse duration and an energy intensity of the laser may be predetermined and adjusted so that optical fiber material is progressively ablated without re-depositing the ablated material or distorting remaining optical fiber geometry.

In a still further embodiment, a method of laser-shaping an end face of an optical fiber includes of first rotating the optical fiber and sweeping a beam of a laser directed at a predetermined angle from perpendicular to a longitudinal axis of the optical fiber back and forth across the rotating optical fiber. After the fiber has "necked" down sufficiently, the rotation motion is essentially stopped and the sweeping laser beam cuts the fiber at a predetermined angle. As in the previous embodiment, the laser may be operated in a continuous mode, the oscillating motion of the laser may be driven by an intermitting sinusoidal signal resulting in two deposits of energy into the optical fiber followed by a cooling period before the next deposits of energy occur, and the pulse duration and an energy intensity of the laser may be predetermined and adjusted so that optical fiber material is progressively ablated without re-depositing the ablated material or distorting remaining optical fiber geometry. The predetermined incident angle $\Theta$ of the laser may range from about 10° to about 60°, more preferably from about 15° to about 25°. The laser-shaping process produces a domed shape optical with a tapered or rounded fiber end with an angled end face and a protruding fiber core. In another method, the optical fiber is rotated while sweeping the laser beam across the rotating optical fiber at a first location, thereafter the beam of the laser is shifted or the optical fiber is shifted so that the sweeping of the beam of the laser occurs at a second location, thereby forming a "pencil-tip" end face on the optical fiber.

BRIEF DESCRIPTION OF THE DRAWINGS

These and other features, aspects and advantages are better understood when the following detailed description is read with reference to the accompanying drawings, wherein.

DETAILED DESCRIPTION

The concepts will now be described more fully hereinafter with reference to the accompanying drawings in which preferred embodiments are shown. This invention may, however, be embodied in many different forms and should not be construed as limited to the embodiments set forth herein. These exemplary embodiments are provided so that this disclosure will be both thorough and complete, and will fully convey the scope of the concepts to those skilled in the art. Like reference numbers refer to like elements throughout the various drawings.

Figure 1:
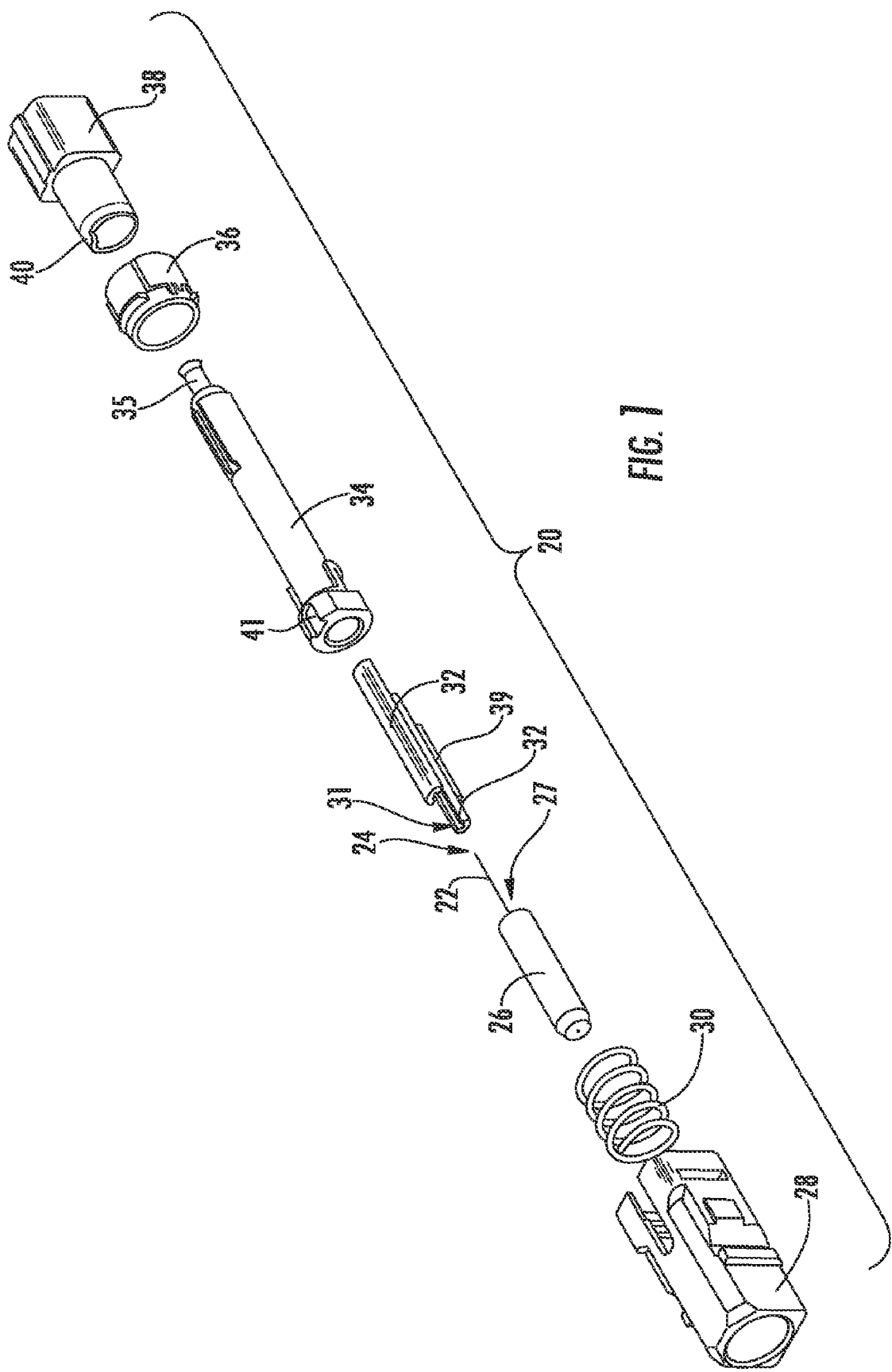
FIG. 1 is a perspective view of a disassembled field-installable connector having an optical fiber stub with a laser shaped end face in accordance with an exemplary embodiment.

Referring now to the drawings, FIG. 1 shows an exemplary embodiment of a field-installable connector 20 (i.e., mechanical splice connector) having a stub optical fiber 22 with a laser-shaped tapered and angled end face 24. The laser-shaped stub optical fiber replaces a conventional mechanically cleaved fiber stub in a field-installable connector. During installation of connector 20, optical fibers may be brought into physical contact within a mechanical splice assembly in either factory or field-assembled applications. The stub optical fiber 22 is of any fiber type known in the art, for example a single-mode or multi-mode fiber comprised of silica or other suitable material(s). The diameter of the inner core region in a single-mode fiber is about 10 μm, and in a multi-mode fiber about 50 μm. The outer cladding region typically has a diameter of about 125 μm, and the cladding comprises a lower refractive index than the core region. In the field, the end portion of an optical fiber of a fiber optic cable, typically termed the field optical fiber to which the connector 20 is to be connected, is inserted in the connector 20 from the end opposite the ferrule 26. The stub optical fiber 22 is brought into contact with the field optical fiber and held in place within a mechanical splice assembly by a cam locking means, such as the UniCam™ mechanical splice assembly offered for sale by Corning Cable Systems, Hickory, N.C.

The field-installable connector 20 comprises extremely accurate optical fiber alignment features operable for aligning (i.e., self-centering) the stub optical fiber 22 and the field optical fiber.

As shown in the FIG. 1, connector 20 forms a portion of a cable assembly with an SC ferrule 26 fixably secured at one end of the stub optical fiber 22. The stub optical fiber 22 is secured within a fiber bore 27 of the ferrule 26 and extends beyond a rear face of the ferrule 26 a predetermined distance, for example from about 2 millimeters to about 15 millimeters, more preferably from about 5 millimeters to about 8 millimeters. Although an SC ferrule 26 and related connector type are shown, the ferrule and connector components may be substituted with any others including, but not limited to, SC, ST, LC, FC, DC, MTP, MU, MT-RJ, UniCam™ and other similar types. Field-installable connector 20 further comprises a connector housing 28 in which the ferrule 26 resides. A spring element 30, such as a compression spring, is operable for providing float to the ferrule 26 within the connector housing 28. Limitations on the extent of float are set by various factors, such as the amount of compression available from the compression spring element 30 and the force required to compress the spring element 30.

To assemble the connector 20, the laser-shaped (i.e., tapered and angled end face) optical stub fiber 22 is inserted into a lengthwise extending alignment feature, for example a V-groove 31, defined by splice parts 32. The splice parts 32 are shown in a staggered configuration. The stub optical fiber 22 and the field optical fiber come into physical contact, end-to-end, within the splice parts 32. A ferrule holder 34 is operable for housing the splice parts 32. The ferrule holder 34 defines a lead-in tube 35 operable for guiding the field optical fiber into the ferrule holder 34 and into the splice parts 32. A camming mechanism is comprised of two components 36, 38 and is operable for applying pressure to a keel 39 of the splice parts 32 in order to compress the splice parts 32 radially inward. Camming mechanism component 38 defines a notch 40 that is inserted into a groove 41 defined by the ferrule holder 34. After the stub optical fiber 22 and the field optical fiber are brought into physical contact, the camming component 38 is rotated, which in turn rotates the ferrule holder 34, which in turn applies the force to the keel 39 of the splice parts 32. When assembled, the field-installable connector 20 secures the stub optical fiber 22 and the field optical fiber in place.

Figure 2:
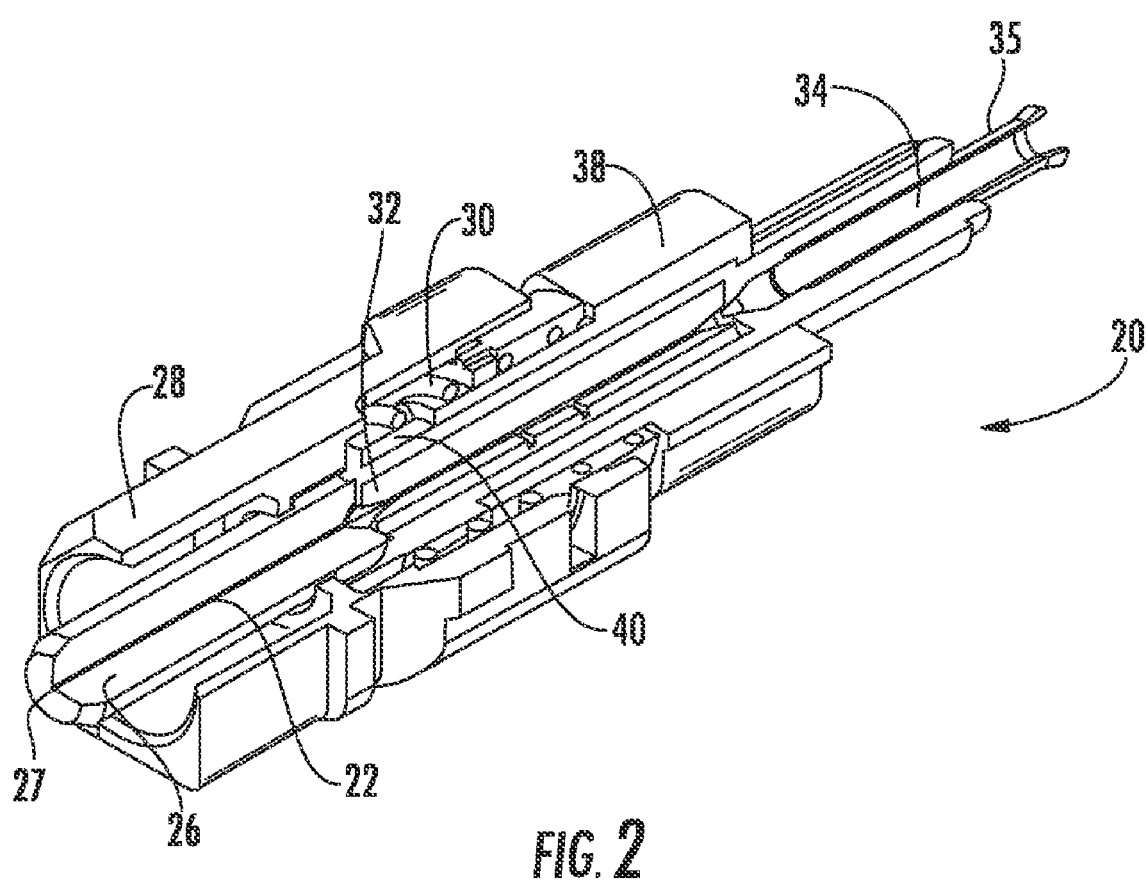
FIG. 2 is a cut-away perspective view of the connector of FIG. 1 in an assembled configuration in accordance with an exemplary embodiment.

Referring to FIG. 2, the field-installable connector is shown assembled. Although not shown, the field optical fiber would be inserted into the opening defined by the ferrule holder 34 and secured within the splice parts 32. The method of laser-shaping the end face of optical fiber is applied to the stub optical fiber, the field optical fiber, however, one of the fibers may be mechanically cleaved using conventional techniques for the field optical fiber. The connector 20 may be assembled in the field and mechanically spliced to a termination point. Although not shown, a rubber boot may be placed over the connector 20 after assembly, the boot operable for sealing and protecting the connector 20 and the mechanical splice point from the environment.

Figure 3:
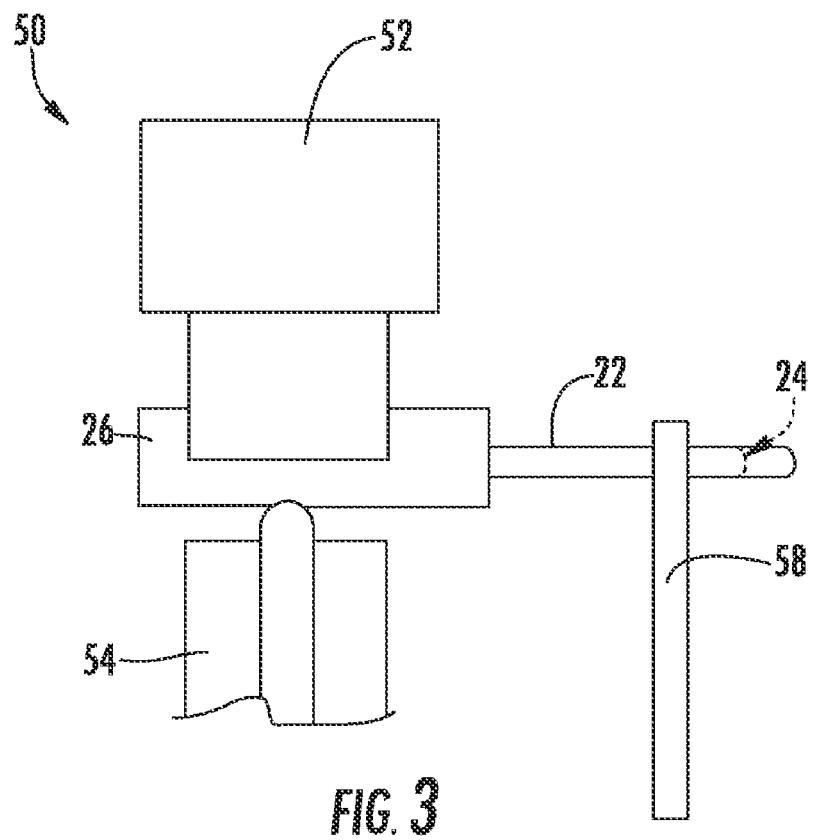
FIG. 3 is a schematic diagram of an optical fiber and ferrule assembly during laser processing in accordance with an exemplary embodiment.

Referring to FIG. 3, a schematic diagram of a ferrule rotating assembly 50 is shown. The assembly 50 includes the ferrule 26 mounted upon the optical fiber 22. To provide for rotation of the optical fiber 22 about its longitudinal axis, the fiber is held in place between a stationary ferrule holder 52 defining an inverted V-groove, and a suitable rotating mechanism 54, such as a servo driven wheel. The stationary ferrule holder 52 is representative of any known means operable for maintaining the position of the ferrule 26 during rotation. The rotating mechanism 54 is representative of any known means operable for rotating the ferrule 26 and its respective optical fiber 22 about their longitudinal axes. The stationary ferrule holder 52 should provide support without undue friction. By way of example, the optical fiber 22 may be rotated at any suitable rate of rotation such as about 2 Hz during the first step of the process, but other rotational speeds are possible. The rotation of the fiber/ferrule assembly is essentially stopped for the second step. The tip of the optical fiber 22 is supported by a second stationary holder 58 comprising a V-groove to minimize the effects of run-out. The amount of fiber protruding beyond the second stationary holder 58 should be sufficiently long to permit cutting and shaping the end of the optical fiber 22 using a laser, and not long enough to result in a possible eccentricity of rotation of the portion being shaped during the first step. Although the terms first step and second step are used, other steps can occur before, during, in-between, or after the first and second steps described herein. For instance, the laser may be indexed relative to the optical fiber during processing to shape the optical fiber with more of a "pencil-tip" like profile.

Figure 4:
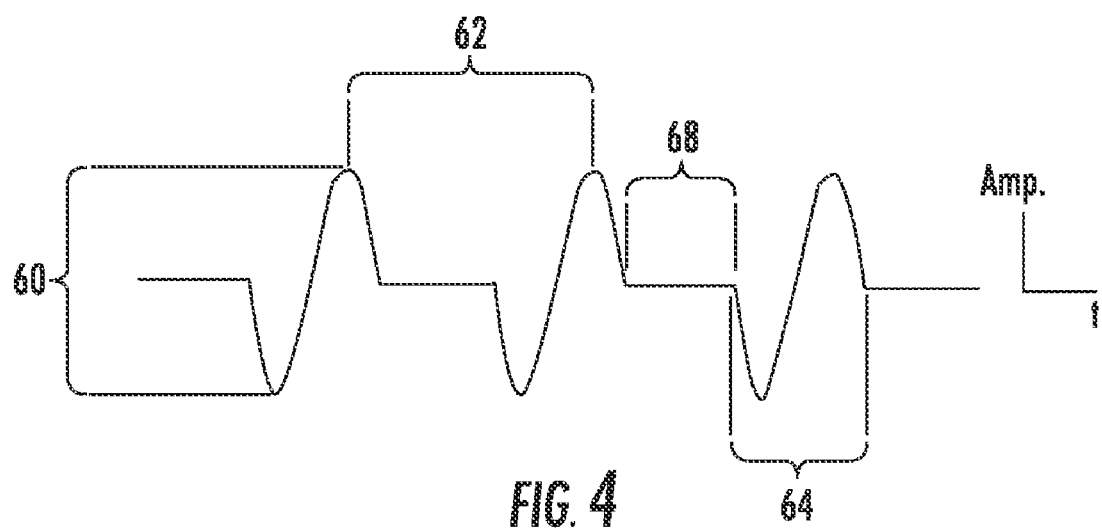
FIG. 4 is an illustration of an intermitting sinusoidal signal that controls a path of a laser during fiber processing in accordance with an exemplary embodiment.

During the first and second step, a laser beam is swept back and forth across the fiber 22. The energy from a commercially available $CO_2$ laser, such as a 60 watt sealed tube $CO_2$ laser offered for sale by Synrad Inc. of Mukilteo, Wash., is focused to a spot of about 150 to 200 μm. In one example, the laser may be focused to a spot size slightly larger than the optical fiber 22 outer diameter. The laser may be operated in a continuous mode at a frequency of about 20 kHz. The oscillating motion of the laser may be driven by an intermitting sinusoidal signal as shown in FIG. 4. By way of example, the frequency of the individual sine wave may be about 50 Hz, while the intermitting burst frequency may be about 12 Hz. The peak-to-peak amplitude is illustrated at reference numeral 60. 1/burst frequency is illustrated at reference numeral 62. 1/signal frequency is illustrated at reference numeral 64.

Figure 5:
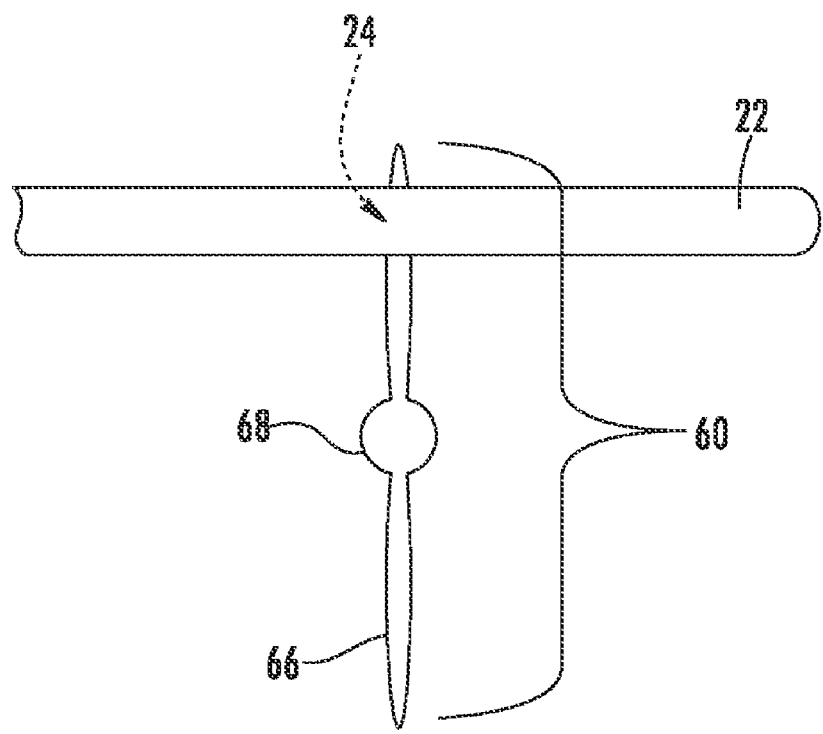
FIG. 5 is a schematic diagram illustrating an optical fiber position relative to a laser path in accordance with an exemplary embodiment.

FIG. 5 is a schematic diagram illustrating optical fiber 22 position relative to the laser path. In one embodiment, the position of the optical fiber 22 may be located about half way between the peak of the sinusoidal laser path and the null or dwell position of the laser. This positioning creates two deposits of energy into the optical fiber 22 followed by a cooling period before the next deposits of energy occur. The burn mark of the laser is illustrated at reference numeral 66 and the center of the laser sweep is illustrated at reference numeral 68. The peak-to-peak amplitude 60 of the laser sweep is also illustrated in FIG. 5.

The laser-shaping of the end face of the optical fiber disclosed herein is achieved using at least a two-step process. The first step shapes the end face of the optical fiber while it is rotating and the second step shapes the end face of the optical fiber after the rotation essentially stops. As used herein, "essentially stopping" or "essentially stopped" means that the rotation of the optical fiber is stopped or slowed to such as small rotational velocity that the laser beam can be swept through the optical fiber to create an angled end surface at the core of the optical fiber. For instance, both steps impinge an amount of the predetermined laser intensity, in the form of a Gaussian intensity distribution, onto the optical fiber 22 to be shaped. Upon contact with optical fiber 22, the radiation of the $CO_2$ laser is absorbed at the surface of the optical fiber 22. The glass at the surface is raised above its vaporization temperature and is ablated away while heat is conducted into the material of the fiber 22. The longer the time the laser is maintained at the surface, the greater the depth of penetration of heat. Therefore, intense short pulses may be used to cause ablation of the surface cladding with minimal melting of the underlying material. The pulse duration and energy intensity of the laser beam are predetermined and adjusted so that the optical fiber material is progressively ablated without re-depositing the ablated material or distorting the remaining optical fiber geometry. The fiber processing method permits precise shaping of the end of the optical fiber. The laser is swept in an oscillating motion across the optical fiber 22 to achieve ablation of the fiber and preferably minimizes overheating from energy in the non-ablative region. Additionally, shaping the optical fiber with the laser while rotating the same also inhibits sag deformation near the outer surface of the optical fiber due to gravity or the like.

Figure 6:
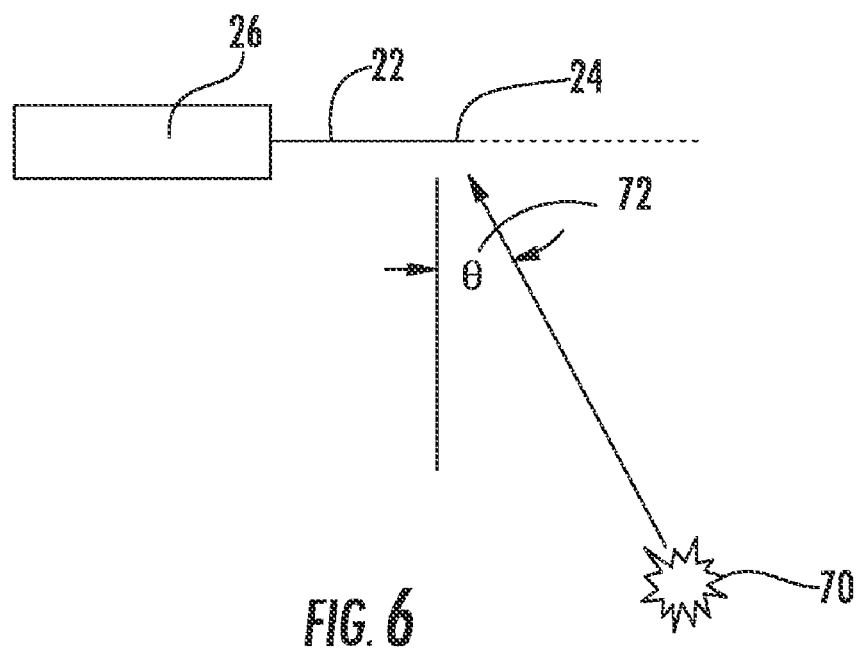
FIG. 6 is a schematic diagram illustrating an orientation of a laser in relation to an optical fiber processed in accordance with an exemplary embodiment.

FIG. 6 is a schematic diagram illustrating an orientation of the laser in relation to the optical fiber 22. The laser beam from a laser source 70 may be directed at an incident angle θ that is between about 5 degrees to about 60 degrees from perpendicular to the longitudinal axis of the optical fiber 22, turned into the end face of the optical fiber 22 as shown. In a preferred embodiment, the angle may range from about 5 degrees to about 35 degrees from perpendicular to the longitudinal axis of the optical fiber 22. In a more preferred embodiment, the angle may range from about 15 degrees to about 25 degrees. The angle is used to overcome the approximate Gaussian energy distribution across the diameter of the laser beam and to produce an angled end face on the optical fiber.

Figure 7:
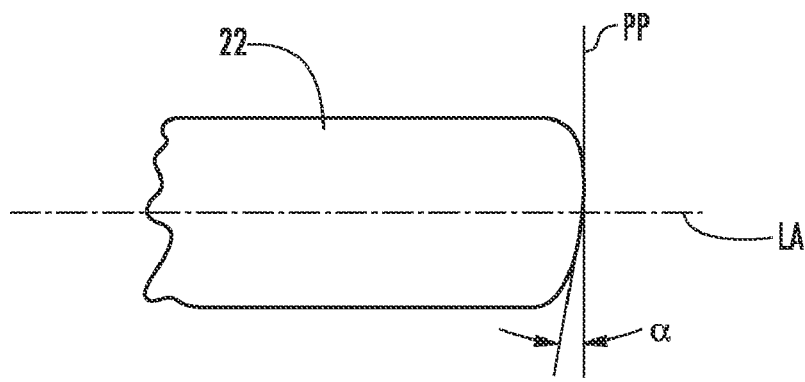
FIG. 7 is a diagram showing the angle of the end face of a laser-shaped optical fiber relative to a plane perpendicular to a longitudinal axis of the optical fiber.
Figure 11:
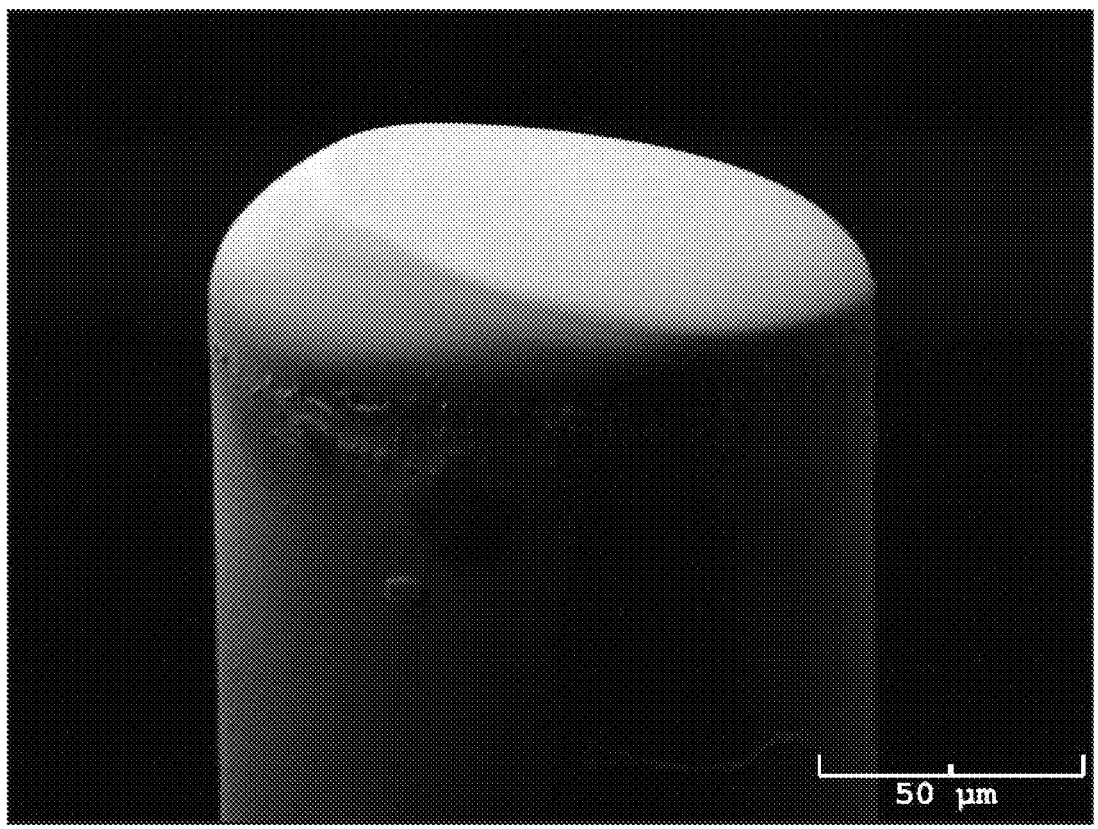
FIG. 11 is an image of a laser-shaped optical fiber end face taken under magnification.

As shown in FIG. 7, the laser-shaped optical fiber 22 has an angled end face portion formed at an angle α. Angle α of the end face of the optical fiber is between 2 degrees and 12 degrees relative to a plane perpendicular PP to a longitudinal axis LA of the optical fiber at the core of the optical fiber. More specifically, the angled end face of the optical fiber is measured as the angle between the tangent line of a domed surface at the core of the optical fiber and a plane perpendicular PP to the longitudinal axis LA of the optical fiber. In preferred embodiments, the angled end face is between 4 degrees and 8 degrees, but other suitable angles are also possible with the concepts disclosed. The core of the fiber will have a domed surface with the edges of the fiber also being curved (i.e., rounded) so that the sharp edges are inhibited (FIG. 11).

Figure 8:
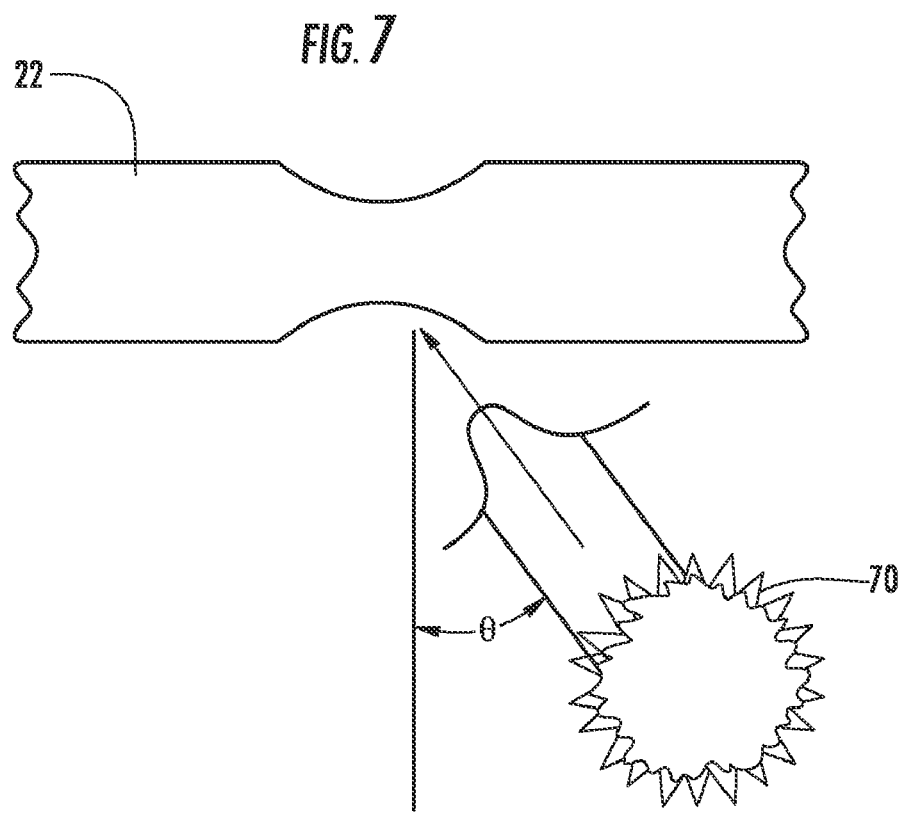
FIGS. 8 and 9 schematically respectively represent an enlarged view of an optical fiber being laser-shaped and the laser-shaped optical fiber in accordance with an exemplary embodiment.
Figure 9:
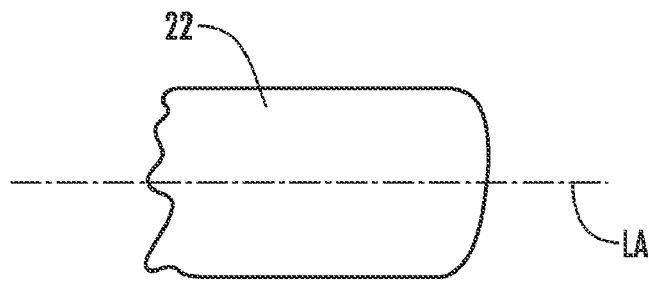

FIGS. 8 and 9 schematically represent an enlarged view of the optical fiber 22 being laser-shaped in accordance with an exemplary embodiment. The first step of the process "necks" the fiber down by ablating a portion of the optical fiber while it is being rotated as shown in FIG. 8. The rotational ablation of the optical fiber can continue for any suitable depth and even into the core of the optical fiber, but does not cut or severe the optical fiber. Before the optical fiber is cut through or severed, the laser ablation and the rotational motion of the optical fiber is essentially stopped. As shown by FIG. 8, a portion of the optical fiber exhibits an hour glass shape from the ablation of the optical fiber during the rotational motion of the first process step. Optionally, the hour glass shape of the optical fiber can be elongated by applying a tensile force to the optical fiber during processing.

The second process step resumes the laser ablation when the optical fiber is essentially stopped and severs the optical fiber at the predetermined angle α relative to a plane that is perpendicular to a longitudinal axis of the optical fiber. FIG. 9 schematically depicts the optical fiber after being severed or cut through. The location of the angled end face cut generally coincides with a portion of the "necked" region of the optical fiber produced by the first process step. In preferred embodiments, the rotational motion of the optical fiber is stopped so that the optical fiber is stationary, thereby creating a high-quality angled end face. The optical fiber processed by the method disclosed preferably has a taper or large edge radius that allows the core gap to be reduced in an angled mechanical splice such as a field installable connector of the like as shown schematically in FIG. 13, and aids fiber insertion into a mechanical splice assembly. In other words, the distal end face of the optical fiber has rounded edges so that it easily slides into the alignment mechanism of a mechanical splice connector or the like. Additionally, the fiber core is positioned near the apex of the domed and tapered angled end face so that the core of the optical fiber can make physical contact with an abutting optical fiber.

Figure 10:
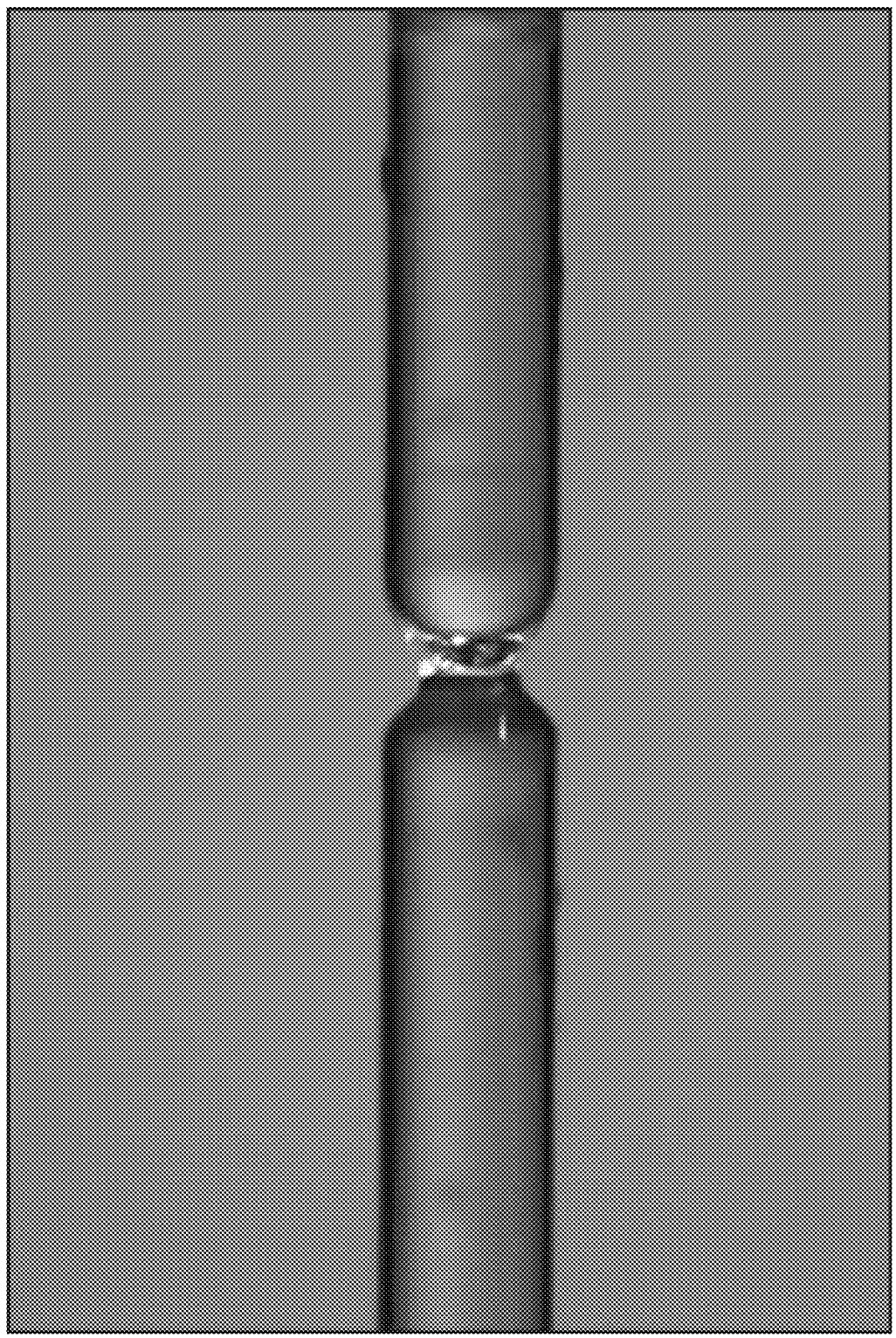
FIG. 10 is an image of an optical fiber being laser-shaped as described herein.

FIG. 10 is an image of an optical fiber being laser-shaped as described herein before the angled portion is formed on the end face. In other words, the optical fiber is not completely cut through. As shown, the laser-shaping has formed a tapered (i.e., "necked" region) where the laser profile ablates a portion of the optical fiber. The laser ablates the outer annular portion of the optical fiber, thereby forming the "necked" or hour glass portion. A "necked" or hour glass portion is formed because the laser has a finite beam width that has a psedo-gaussian intensity profile (i.e., the intensity is greater near the center and rolls off toward the edges of the beam as depicted in FIG. 8), thereby ablating the optical fiber the most near the center of the beam.

FIG. 11 is an image of a laser-shaped optical fiber end face taken under magnification of about 600×. As shown, the optical fiber has rounded edges and a tapered and angled end face. This optical fiber was laser-shaped using a 60 Watt $CO_2$ laser and rotating the optical fiber at about 2 Hz. The frequency of the individual sine wave was about 40 Hz, while the intermitting burst frequency was about 6 Hz. The laser was operated at a 30 percent duty cycle. The rotational step took about 1.5 seconds and the stationary step took about 1 second. Of course, other suitable results are possible using many other parameters such as rotation speed, frequencies, power levels, incident angles, etc.

Figure 12:
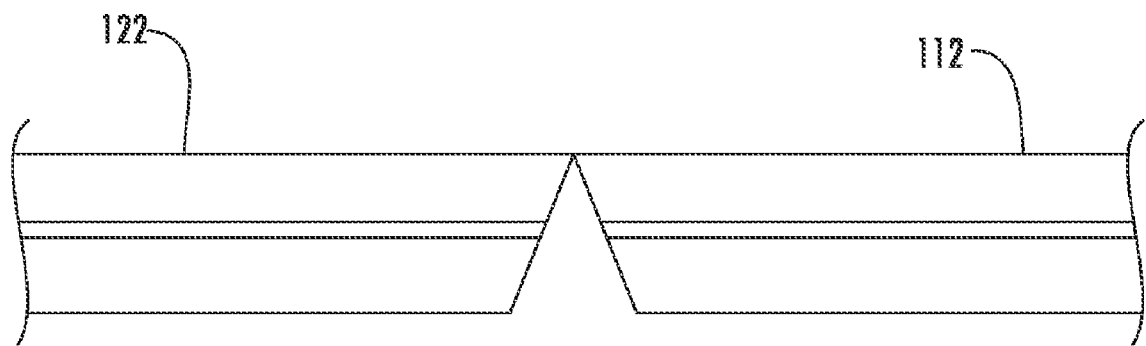
FIGS. 12 and 13 schematically depict the advantages of the laser-shaping an optical fiber described herein compared with a conventional mechanical cleaved optical fiber.

The concepts disclosed herein are advantageous for mechanical splice connectors and the like. Illustratively, FIGS. 12 and 13 respectively schematically depict the abutment of a conventional mechanically angled cleaved optical stub fiber 122 and a laser-shaped optical stub fiber 222 with a field-cleaved optical fiber 112 to show the advantages of the latter. Specifically, FIG. 12 shows a worst case scenario of the alignment and abutment of the conventional mechanically angled cleaved optical stub fiber 122 being mated with the field-cleaved optical fiber 112 where the mechanically cleaved angled end faces are about 180 degrees out of phase. As shown in FIG. 12, there is a substantial gap between the cores (represented by the shaded center portion) of the optical fibers. This gap between the cores of the optical fibers in FIG. 12 decreases optical performance (i.e, increases optical attenuation) by increasing back-reflectance and inhibiting the transmission of the optical signal between the cores of the optical fibers, thereby reducing the quality of the mechanical splice.

Figure 13:
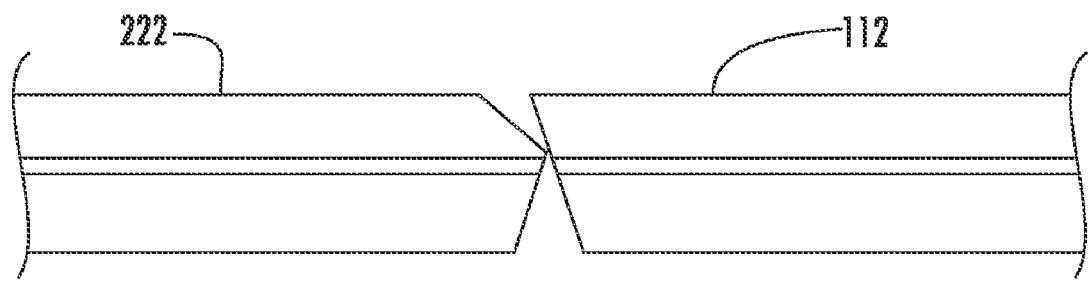

On the other hand, FIG. 13 shows a worst case scenario of the abutment of the laser-shaped optical stub fiber 222 disclosed herein with the field-cleaved optical fiber 112. As shown, the optical cores (represented by the shaded center portion) of the respective optical fibers are in close proximity no matter the rotational orientation between the optical fibers. Consequently, the craft can perform high-quality mechanical splices in the field since the optical attenuation of the mechanical splice is relatively low no matter the position of the optical fibers. In other words, the optical performance (i.e., attenuation) of the mechanical splices due to the rotation position of the optical fibers is generally repeatable since the orientation between optical fibers will not tend to increase or decrease the gap between optical fibers. Thus, the craft can advantageously make high-quality mechanical splices in the field in a reliable and repeatable manner.

Figure 14:
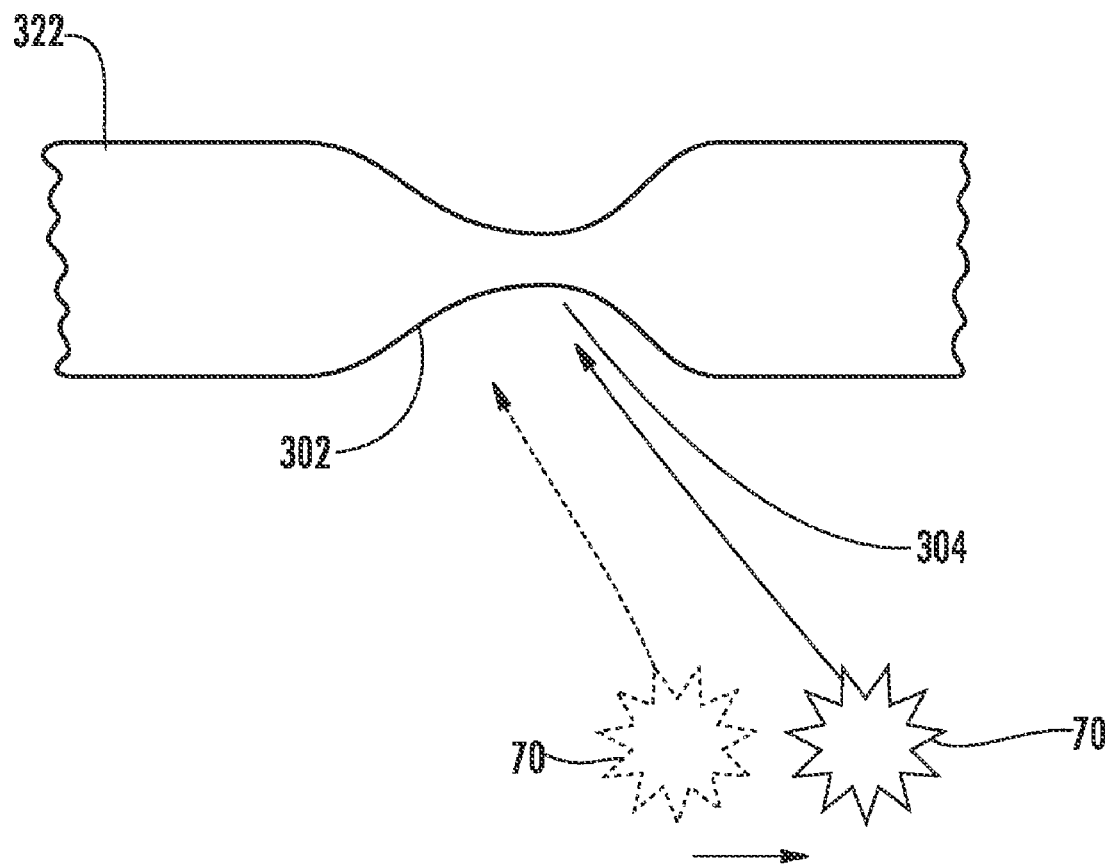
FIGS. 14 and 15 schematically respectively represent an enlarged view of an optical fiber being laser-shaped and the laser-shaped optical fiber in accordance with another embodiment.
Figure 15:
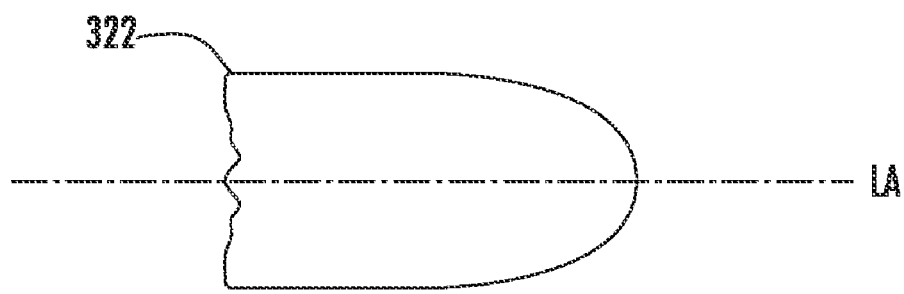

Other methods of laser-shaping the end face of an optical fiber are also possible. For instance, FIGS. 14 and 15 respectively depict an end face of an optical fiber 322 being formed with a "pencil-tip" end face and the finished optical fiber. "Pencil-tip" means that the end face has a relatively longer tapered portion that leads to the end face having the optical core. The pencil-tip end face can have an angled end face as discussed above or it may have an end face with a non-angled end face. The method of forming the pencil tip end face is similar to the first step of the process described herein, but further involves the step of shifting the beam of the laser or shifting the optical fiber so that the sweeping of the laser beam occurs at a second location 304. In other words, the first step is performed at a first location 302 of the optical fiber while rotating the optical fiber to form a "necked" region as shown in FIG. 8. Then shifting (i.e., moving the laser and/or the optical fiber) the ablation toward the portion of the optical fiber that will be cut through to create a longer tapered portion (i.e., the pencil-tip shape) of the optical fiber. FIG. 14 depicts the shifting from the first location 302 to the second location 304 as represented by the arrow. For instance, the shifting may be a suitable distance such as between 2 microns and 300 microns, but any suitable distance is possible. Thereafter, the beam of the laser is swept through the optical fiber to cut the same. Sweeping the beam of the laser through the optical fiber while it is rotating at the second location forms the optical fiber end face as shown in FIG. 15. In other words, the pencil-tip end face has an angle of about zero degrees with a plane perpendicular to the longitudinal axis of the optical fiber. Alternatively, an angled end face (e.g., an angle between 2 and 12 degrees) can be formed on the end of the optical fiber by sweeping the beam of the laser through the optical fiber when it is essentially stopped as described.

Although the process of laser-shaping the end face of an optical fiber has been described with reference to preferred embodiments and examples thereof, other embodiments and examples may perform similar functions and/or achieve similar results. All such equivalent embodiments and examples are within the spirit and scope of the present invention and are intended to be covered by the following claims.

We claim:

1. A method of cutting an optical fiber and shaping its end, comprising:
   rotating the optical fiber;
   sweeping a beam of a laser across the rotating optical fiber; and
   essentially stopping the rotation of the optical fiber and sweeping the beam of the laser through the optical fiber, thereby cutting an end face of the optical fiber at a predetermined angle which is less than 90 degrees from a longitudinal axis of the optical fiber so that the end face of the optical fiber has a tapered and angled end face.

2. The method of claim 1, wherein the end face of the optical fiber has an angled end face between 2 degrees and 12 degrees relative to a plane perpendicular to an axis of the stub optical fiber.

3. The method of claim 1, wherein the laser is operated in a continuous mode or a pulsed mode.

4. The method of claim 1, wherein an oscillating motion of the laser is driven by an intermitting sinusoidal signal resulting in two deposits of energy into the optical fiber followed by a cooling period before the next deposits of energy occur; and
   wherein a pulse duration and an energy intensity of the laser are predetermined and adjusted so that optical fiber material is progressively ablated without re-depositing the ablated material or distorting remaining optical fiber geometry.

5. The method of claim 1, wherein the process produces a domed shape optical fiber end having a protruding fiber core.

6. The method of claim 1, wherein the fiber is a stub optical fiber of a field-installable connector.

7. A method of fabricating a field-installable connector used in a mechanical splicing application, comprising:
   rotating a stub optical fiber secured within a ferrule of the field-installable connector;
   sweeping a beam of a laser across the rotating stub optical fiber; and
   essentially stopping the rotation of the optical fiber and sweeping the beam of the laser through the optical fiber, thereby cutting an end face of the optical fiber at a predetermined angle less than 90 degrees from a longitudinal axis of the optical fiber so that the end face of the optical fiber has a tapered and angled end face.

8. The method of claim 7, wherein the end face of the optical fiber has an angled end face between 2 degrees and 12 degrees relative to a plane perpendicular to an axis of the stub optical fiber.

9. The method of claim 7, wherein the laser is operated in a continuous mode or a pulsed mode.

10. The method of claim 7, wherein an oscillating motion of the laser is driven by an intermitting sinusoidal signal resulting in two deposits of energy into the optical fiber followed by a cooling period before the next deposits of energy occur; and
    wherein a pulse duration and an energy intensity of the laser are predetermined and adjusted so that optical fiber material is progressively ablated without re-depositing the ablated material or distorting remaining optical fiber geometry.

11. The method of claim 7, wherein the stub optical fiber and a field optical fiber are secured end-to-end in physical contact in an alignment feature operable for self-centering the stub optical fiber and the field optical fiber.

12. The method of claim 7, wherein the stub optical fiber and the field optical fiber are secured in place using a camming means.

13. A method of cutting an optical fiber and shaping its end, comprising:
    rotating the optical fiber;
    sweeping a beam of a laser across the rotating optical fiber at a first location;
    shifting the beam of the laser or shifting the optical fiber so that the sweeping of the beam of the laser occurs at a second location; and
    sweeping the beam of the laser through the optical fiber at a second location so that the optical fiber has a pencil-tip end face.

14. The method of claim 13, wherein the optical fiber is rotating when the sweeping the beam of the laser at the second location.

15. The method of claim 13, further including the step of essentially stopping the rotation of the optical fiber and sweeping the beam of the laser through the optical fiber to create an angled end face on the optical fiber.

* * * * *